Oct. 5, 1926.
C. H. ROBBINS
1,602,213
ART OF TESTING MATERIALS OF HYGROSCOPIC NATURE
Filed May 16, 1919     2 Sheets-Sheet 1
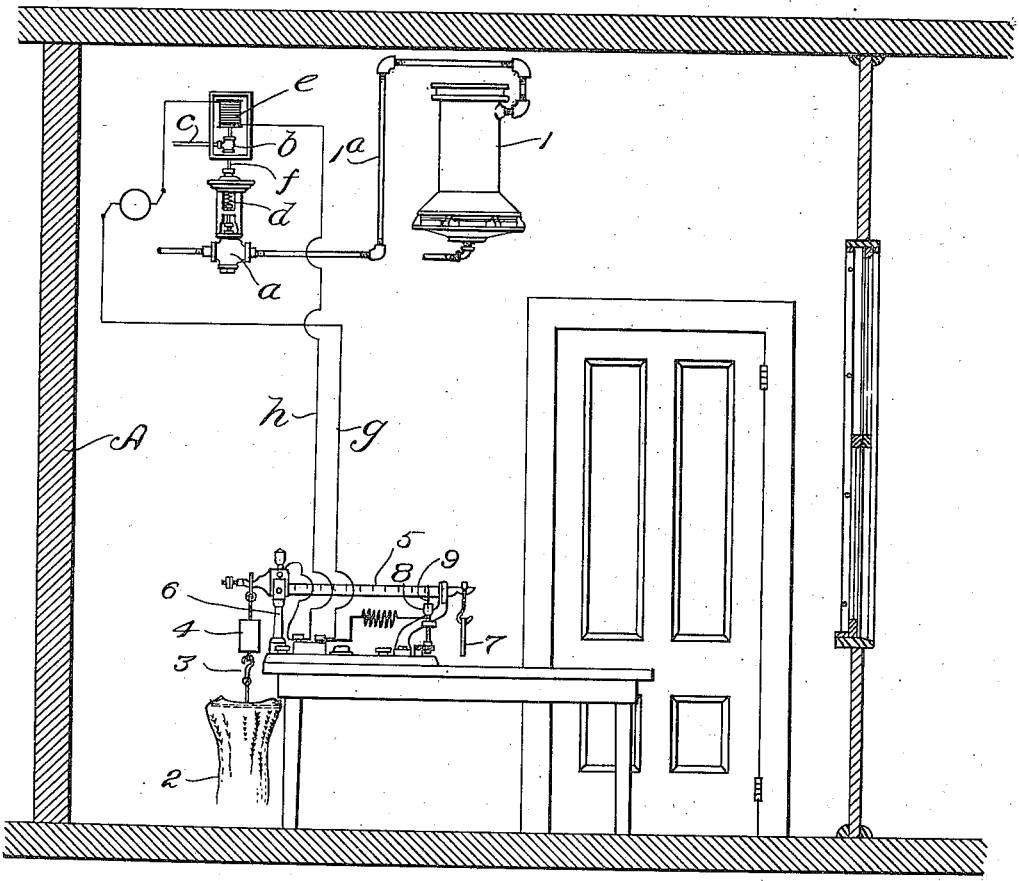
Fig. 1.
Fig. 2.
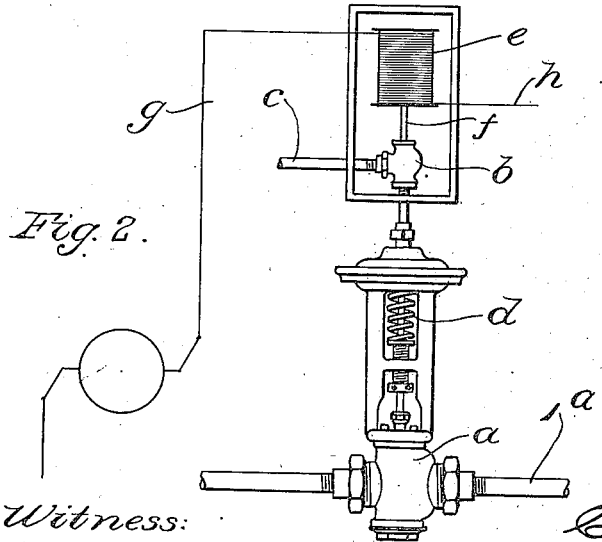
Witness:
Oscar F. Hill
Inventor:
Chas. H. Robbins.
by Chas. F. Randall
Attorney.

Oct. 5, 1926.  
C. H. ROBBINS  
1,602,213  
ART OF TESTING MATERIALS OF HYGROSCOPIC NATURE  
Filed May 16, 1919  2 Sheets-Sheet 2
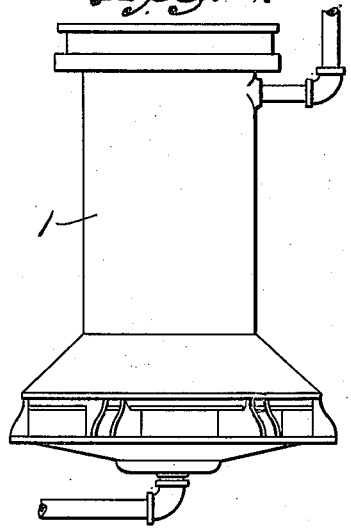
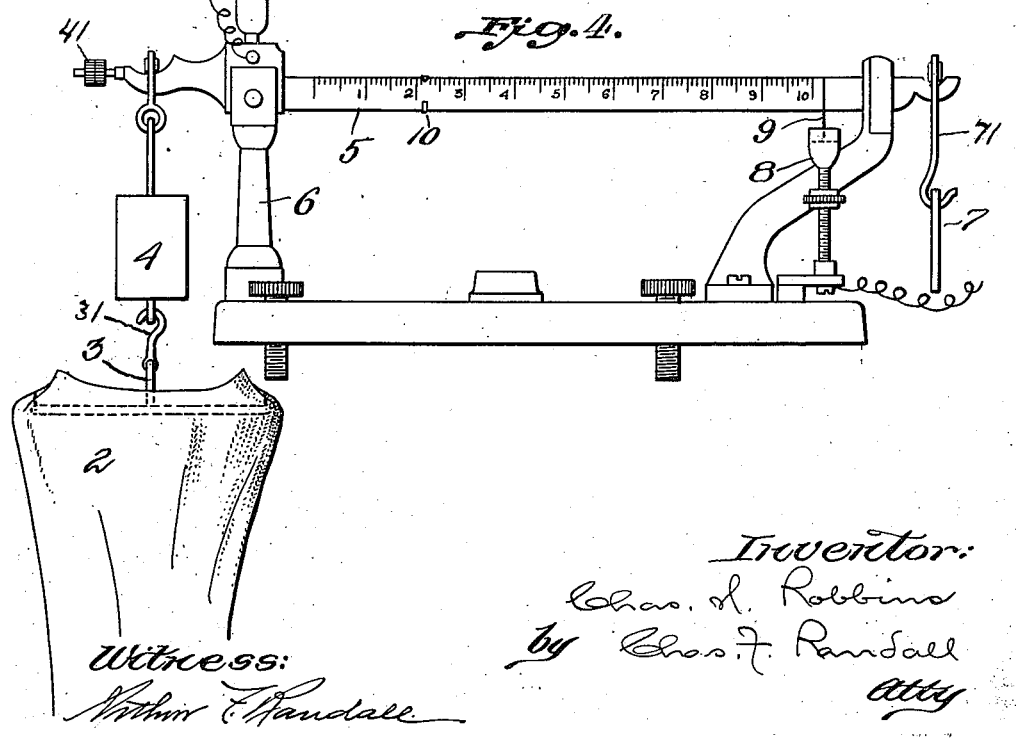

Patented Oct. 5, 1926.

1,602,213

UNITED STATES PATENT OFFICE.

CHARLES H. ROBBINS, OF NEW BEDFORD, MASSACHUSETTS, ASSIGNOR TO MANOMET MILLS, OF NEW BEDFORD, MASSACHUSETTS, A CORPORATION OF MASSACHUSETTS.

ART OF TESTING MATERIALS OF HYGROSCOPIC NATURE.

Application filed May 16, 1919. Serial No. 297,658.

The invention has for one of its main objects to perform the testing of fibers, yarns and fabrics composed thereof, and other hygroscopic materials and products, upon a basis that will permit true and accurate determination of strength, actual fiber content or the like, or other qualities, properties, or factors, that are affected or influenced by the moisture-content of the material or product while undergoing a test, without the uncertainties and errors that occur when the moisture-content is not accurately known. Also, without it being necessary to correlate what is known as "regain" with either temperature, relative humidity, or barometric conditions, and without it being necessary to maintain a constant temperature. Also, without it being necessary to possess and refer to prepared regain tables and charts, and without any other calculations than the very simplest.

The invention, accordingly, comprises an improvement in the art of testing materials and products of hygroscopic nature.

The tests themselves may be any of those which usually are performed incidentally to sale transactions and to manufacturing operations. For example, a test may consist simply in a weighing operation, in order to ascertain the relative proportion of water in a given quantity of cotton or other fiber. Or it may consist in a weighing operation to ascertain the relative proportion of moisture content in a lap, sliver, roving, yarn, etc., in process of manufacture. Or it may consist in a breaking test for the ascertainment of the strength of a yarn or a piece of cloth.

The drawings show one means of carrying into effect the said improvement in the art of testing materials.

Fig. 1 is a sectional view of a closed cabinet containing one form and arrangement of apparatus.

Fig. 2 is a view on a somewhat larger scale than Fig. 1 showing separately the valve-mechanism of Fig. 1.

Fig. 3 shows the humidifier of Fig. 1 on a still larger scale.

Fig. 4 shows the automatic regulator.

The improvement in the art of testing comprises, in the first instance, the step of definitely and accurately standardizing quantitatively the moisture-content of the sample which is subjected to the test or tests. In other words it comprises the step of giving an exact predetermined moisture-content to the test-sample, by adding to or taking from its moisture-content, so that the strength, actual weight of fiber, etc., admit of being determined with practical certainty. Since the strength and weight of fibrous materials, for instance, both vary with the moisture-content, the true strength, and the true quantitative determination cannot be arrived at with certainty and correctly when the moisture-content has not been reliably ascertained.

In conformity with the improvement in the art, the said quantitative standardization of the test-sample is effected by exposing the latter in an atmosphere that is humidified, as by means of a humidifier, I, under control of a hygrometer of which the determinative element or moisture-sensitive agent, otherwise control-element consists essentially in a quantity 2, of known bone-dry weight, of material of the same kind as the sample, exposed to such atmosphere. This standardization is effected in a closed cabinet A, in order that the atmosphere may remain unchanging in the sense of remaining constant and without the changes of conditions which would result in case of general circulation of air.

The said control-element, i. e., determinative element or moisture-sensitive agent 2 is shown as a piece of cloth, termed by me a "shirt" and usually composed of knit goods, suspended by means of a suitable hook or hanger 31 and wire frame 3 from a weight 4 hung upon the short arm of a scale-beam 5 pivotally mounted upon a support 6. Weight 4 is employed as a counterbalance for the long arm of the scale-beam, and the hook 71 that is applied to the free extremity of such arm. Exactness in the counterbalancing of the said long arm and hook is provided for by means of one or more small weights 41, which are mounted upon the extremity of the short arm of the scale-beam with capacity for adjustment toward and from the beam-fulcrum. With the long arm of the scale-beam are combined the weights 7 and 10, the first-mentioned thereof being a disk or the like that is hung upon hook 71 depending from the free extremity of the said long arm, and the other thereof being a small slide that is mounted upon such arm with capacity to be shifted along said arm toward and from the scale-beam fulcrum. The weight 7 serves, as one of its functions, to balance the weight of hanger 31 and the bone-dry weight of the shirt, and the two weights (7 and 10) serve individually or conjointly, as the case may be, to weigh the percentage of moisture absorbed by the shirt. An electric circuit embracing the controlling connections for the humidifier has terminals constituted by a mercury cup 8 mounted adjacent the scale-beam, and a wire or point 9 carried by the scale-beam and adapted to dip into the said cup. When the wire or point is separated from the mercury, the humidifier is inactive and no humidity is supplied to the atmosphere of the cabinet; when the wire or point touches or enters the mercury the humidifier is made active and supplies humidity.

A humidifier of conventional form is represented at 1 in Figs. 1 and 3 of the drawings. It may be of any approved character and construction. The valve mechanism thereof, as represented in Figs. 1 and 2, is of ordinary character, comprising a balanced valve $a$ in connection with the water supply-pipe $1^a$ leading to the humidifier, a valve $b$ which controls the air-pressure coming through the air-supply pipe $c$ by means of which the said balanced valve is operated in opposition to its actuating spring $d$, and a solenoid $e$ having its core joined by a connection $f$ with the said air-valve. The wiring $g$, $h$, of the electric circuit governed by the make and break device constituted by the mercury cup 8 and wire or point 9 is combined with that of the solenoid, so that the latter is controlled by means of the said make and break device; in turn the solenoid controls the working of the humidifier in well-known manner which will be obvious.

In the cabinet equipped with the above-described apparatus, including the shirt, the test-sample is placed, the weight-load carried by the long arm of the scale-beam being varied or adjusted according to the amount of humidity required in the test sample for its quantitative standardizing. Usually, primarily, such weight-load overbalances the scale-beam so that the wire or point 9 dips into the mercury, closing the circuit and thereby rendering the humidifier active so as to supply humidity to the atmosphere within the cabinet. This continues until the shirt has absorbed sufficient moisture to balance the scale-beam and withdraw the wire or point from the mercury, whereby the circuit will be broken and the humidifier will become inactive. Any subsequent decrease in the humidity of the atmosphere within the cabinet, and resulting loss of regain of the shirt, will be compensated for through the humidifier being automatically rendered active again, and consequently the moisture-content of the atmosphere will be maintained at a constant amount. After the test-sample has remained in the thus regulated atmosphere sufficiently long to ensure that its moisture-content has conformed to the state of humidity of the said atmosphere, the test or tests is or are performed in the said atmosphere upon the thus-standardized test-sample.

By reason of using a "shirt" of the same kind of material as the test-sample, of cotton in case the sample is of cotton, silk in the case of silk, wool in the case of wool, etc., practically identical amounts of moisture will be taken up by both the shirt and the sample. Consequently, by having the scale-beam properly graduated, and by making obvious adjustments of the scale-weight thereon, the test-sample can be given any desired weight of regain, i. e., percentage of moisture-content for the testing.

In practice, the shirt employed has been of 1000 grains, bone-dry weight. The (detachably applied) weight 7 has been proportioned to exactly balance the said 1000 grains weight of the shirt, plus the desired per cent of acquired moisture. The parts and the sliding scale-weight 10 have been so proportioned that when the sliding scale-weight 10 is at the outer end of the graduations it will balance 10 grains. The ratio being 10: 1000, when at such end the sliding scale-weight will balance one per cent of the bone-dry weight of the shirt. The scale-beam has been graduated for tenths and hundredths, and hence the graduations indicate tenths and hundredths of one per cent of the bone-dry weight of the shirt. In keeping with such graduations, the scale is constructed and calibrated to be sensible to a variation in weight of one-tenth of one grain. Therefore, in virtue of the foregoing ratio, the sliding scale-weight 10 will indicate by direct reading (self-computing) differences or variations of one one-hundredth of one per cent of the bone-dry weight of the shirt hung on the load arm of the scale, or of any number of hundredths or tenths of one per cent up to one per cent. Thus, according to the present demonstration of the principles of the invention, adjustment of the sliding weight 10 enables any desired fraction of one per cent of the moisture-content in the shirt to be weighed. The two weights 7 and 10 enable the desired percentage (with fraction if required) to be acquired by the test-samples.

What is claimed as the invention is:—

1. The art of standardizing and testing for strength or other properties that are influenced by humidity materials of hygroscopic nature, which consists in (a) producing in an otherwise unchanging atmosphere a predetermined degree of humidity through a humidifying agency controlled by variations in the weight of moisture absorbed by a control-element consisting of a known bone-dry weight of material of the same kind as that to be tested, said degree being attained and maintained through adjustment of the point at which the humidifying agency shall become operative or inoperative, (b) quantitatively standardizing by addition or subtraction as the case may be, under such control the moisture content of a test-sample of the material to be tested, by subjection to the said atmosphere, and (c) performing within the said atmosphere the test or tests upon the moisture-content-standardized test-sample.

2. The art of standardizing for testing for strength or other properties that are influenced by humidity materials of hygroscopic nature, which consists in (a) producing in an otherwise unchanging atmosphere a predetermined degree of humidity through a humidifying agency controlled by variations in the weight of moisture absorbed by a control-element consisting of a known bone-dry weight of material of the same kind as that to be tested, said degree being attained and maintained through adjustment of the point at which the humidifying agency shall become operative or inoperative, as the case may be, under such control, and (b) quantitatively standardizing the moisture content of a test-sample of the material to be tested by subjection to the said atmosphere.

In testimony whereof I affix my signature.

CHARLES H. ROBBINS.